US011595663B2

(12) United States Patent
Egilmez et al.

(10) Patent No.: US 11,595,663 B2
(45) Date of Patent: Feb. 28, 2023

(54) SECONDARY TRANSFORM DESIGNS FOR PARTITIONED TRANSFORM UNITS IN VIDEO CODING

(71) Applicant: QUALCOMM Incorporated, San Diego, CA (US)

(72) Inventors: Hilmi Enes Egilmez, San Diego, CA (US); Vadim Seregin, San Diego, CA (US); Amir Said, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/777,267

(22) Filed: Jan. 30, 2020

(65) Prior Publication Data
US 2020/0252622 A1 Aug. 6, 2020

Related U.S. Application Data

(60) Provisional application No. 62/800,247, filed on Feb. 1, 2019.

(51) Int. Cl.
H04N 19/159 (2014.01)
H04N 19/176 (2014.01)
H04N 19/60 (2014.01)
H04N 19/96 (2014.01)

(52) U.S. Cl.
CPC ......... H04N 19/159 (2014.11); H04N 19/176 (2014.11); H04N 19/60 (2014.11); H04N 19/96 (2014.11)

(58) Field of Classification Search
CPC .... H04N 19/159; H04N 19/176; H04N 19/60; H04N 19/96; H04N 19/122; H04N 19/18; H04N 19/1883; H04N 19/124
See application file for complete search history.

(56) References Cited

U.S. PATENT DOCUMENTS 10,306,229 B2   5/2019   Zhao et al.
10,349,085 B2   7/2019   Said et al.
10,448,053 B2   10/2019  Said et al.
(Continued)

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

Primary Examiner — Maria E Vazquez Colon
(74) Attorney, Agent, or Firm — Shumaker & Sieffert, P.A.

(57) ABSTRACT

An example device applies a primary transform to a current block of video data to create primary transform coefficients. The device determines whether intra sub-partitioning is applied to the current block of video data. The device applies a primary transform to the current block. The device also determines whether a primary transform size for the current block of video data is at least a predetermined size. Based on intra sub-partitioning being applied and the primary transform size being at least the predetermined size, the device applies a secondary transform to primary transform coefficients and codes the current block of video data based on the secondary transform.

17 Claims, 14 Drawing Sheets

(56) References Cited

U.S. PATENT DOCUMENTS

| | | | |
|---|---|---|---|
| 10,491,922 | B2 | 11/2019 | Zhao et al. |
| 2017/0094314 | A1 | 3/2017 | Zhao et al. |
| 2018/0020218 | A1 | 1/2018 | Zhao et al. |
| 2018/0103252 | A1* | 4/2018 | Hsieh .................. H04N 19/176 |
| 2019/0007705 | A1 | 1/2019 | Zhao et al. |
| 2019/0297351 | A1 | 9/2019 | Said et al. |
| 2019/0373261 | A1 | 12/2019 | Egilmez et al. |
| 2020/0044447 | A1* | 2/2020 | Rechtiene .............. H02J 3/388 |
| 2020/0084447 | A1* | 3/2020 | Zhao .................. H04N 19/176 |
| 2020/0366895 | A1* | 11/2020 | De Luxán Hernández ................ H04N 19/105 |
| 2020/0366900 | A1* | 11/2020 | Jun ...................... H04N 19/176 |
| 2021/0227213 | A1* | 7/2021 | Kim .................... H04N 19/132 |

OTHER PUBLICATIONS

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

Chen J., et al., "Algorithm Description of Joint Exploration Test Model 1," 1, JVET Meeting; Oct. 19, 2015-Oct. 21, 2015 Geneva, CH The Joint Video Exploration Team of ISO/IEC JTC1/SC29/WG11 and ITU-T SG.16 ); URL: http://phenix.int-evry.fr/jvet/ No. JVET-A1001, Feb. 24, 2016 (Feb. 24, 2016), XP030150000, 27 pages.

Ergen S., "ZigBee/IEEE 802.15.4 Summary", Sep. 10, 2004, 37 Pages.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems "Multiplexing Protocol for Low Bit Rate Multimedia Communication," Jul. 2001, pp. 1-74.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

Jain A.K., "A Sinusoidal Family of Unitary Transforms", IEEE Transactions on Pattern Analysis and Machine Intelligence, Oct. 1, 1979, pp. 356-365, IEEE Service Center, XP011242370, ISSN: 0162-8828.

Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html; [ Retrieved on Feb. 9, 2017].

Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.

Wien M, "High Efficiency Video Coding, Coding Tools and Specification," Chapter 5, 2015, pp. 133-160.

Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.

Albrecht M., et al., "Description of SDR, HDR and 360° Video Coding Technology Proposal by Fraunhofer HHI", 10. JVET Meeting, Oct. 4, 2018-Apr. 20, 2018, San Diego (The Joint Video Eeploration Team of ISO/IEC JTC1/SC29/WG11 and ITU-TSG.16), URL: http://phenix.int-evry.fr/jvet/. No. JVET-J0014-v4, Apr. 12, 2018 (Apr. 12, 2018), XP030151173, 84 pages, section [2.1.7 Inverse transforms] section [2.1.9 Intra prediction] section [2.1.9.1 Line-based intra coding mode].

International Search Report and Written Opinion—PCT/US2020/016096—ISA/EPO—dated Jun. 8, 2020.

* cited by examiner

SECONDARY TRANSFORM DESIGNS FOR PARTITIONED TRANSFORM UNITS IN VIDEO CODING

This application claims the benefit of U.S. Provisional Patent Application 62/800,247, filed Feb. 1, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for transform coding in video coding. Transform coding is one element of modern video compression standards. In some examples, transform coding includes secondary transform designs that can be used with transform coding schemes applying partitioning on transform units (TUs). This disclosure describes secondary transform designs that may improve coding gains and may be used in the context of advanced video codecs, such as extensions of HEVC or the next generation of video coding standards (e.g., H.266/Versatile Video Coding (VVC)).

In one example, a method includes determining whether intra sub-partitioning is applied to a current block of video data; applying a primary transform to the current block of video data to generate primary transform coefficients; based on intra sub-partitioning being applied, determining whether a size of the primary transform is at least a predetermined size; based on intra sub-partitioning being applied and the size of the primary transform being at least the predetermined size, applying a secondary transform to the primary transform coefficients; and coding the current block of the video data based on the secondary transform.

In another example, a device includes a memory configured to store video data; and one or more processors implemented in circuitry and in communication with the memory, the one or more processors being configured to: determine whether intra sub-partitioning is applied to a current block of video data; apply a primary transform to the current block of video data to generate primary transform coefficients; based upon intra sub-partitioning being applied, determine whether a size of the primary transform is at least a predetermined size; based on intra sub-partitioning being applied and the size of the primary transform being at least the predetermined size, apply a secondary transform to the primary transform coefficients; and code the current block of the video data based on the secondary transform.

In yet another example, a computer-readable storage medium includes instructions stored thereon that, when executed, cause one or more processors to determine whether intra sub-partitioning is applied to a current block of video data; apply a primary transform to the current block of video data to generate primary transform coefficients; based on intra sub-partitioning being applied, determine whether a size of the primary transform is at least a predetermined size; based on intra sub-partitioning being applied and the size of the primary transform being at least the predetermined size, apply a secondary transform to the primary transform coefficients; and code the current block of the video data based on the secondary transform.

The details of one or more examples are set forth in the accompanying drawings and the description below. Other features, objects, and advantages will be apparent from the description, drawings, and claims.

DETAILED DESCRIPTION

Figure 1:
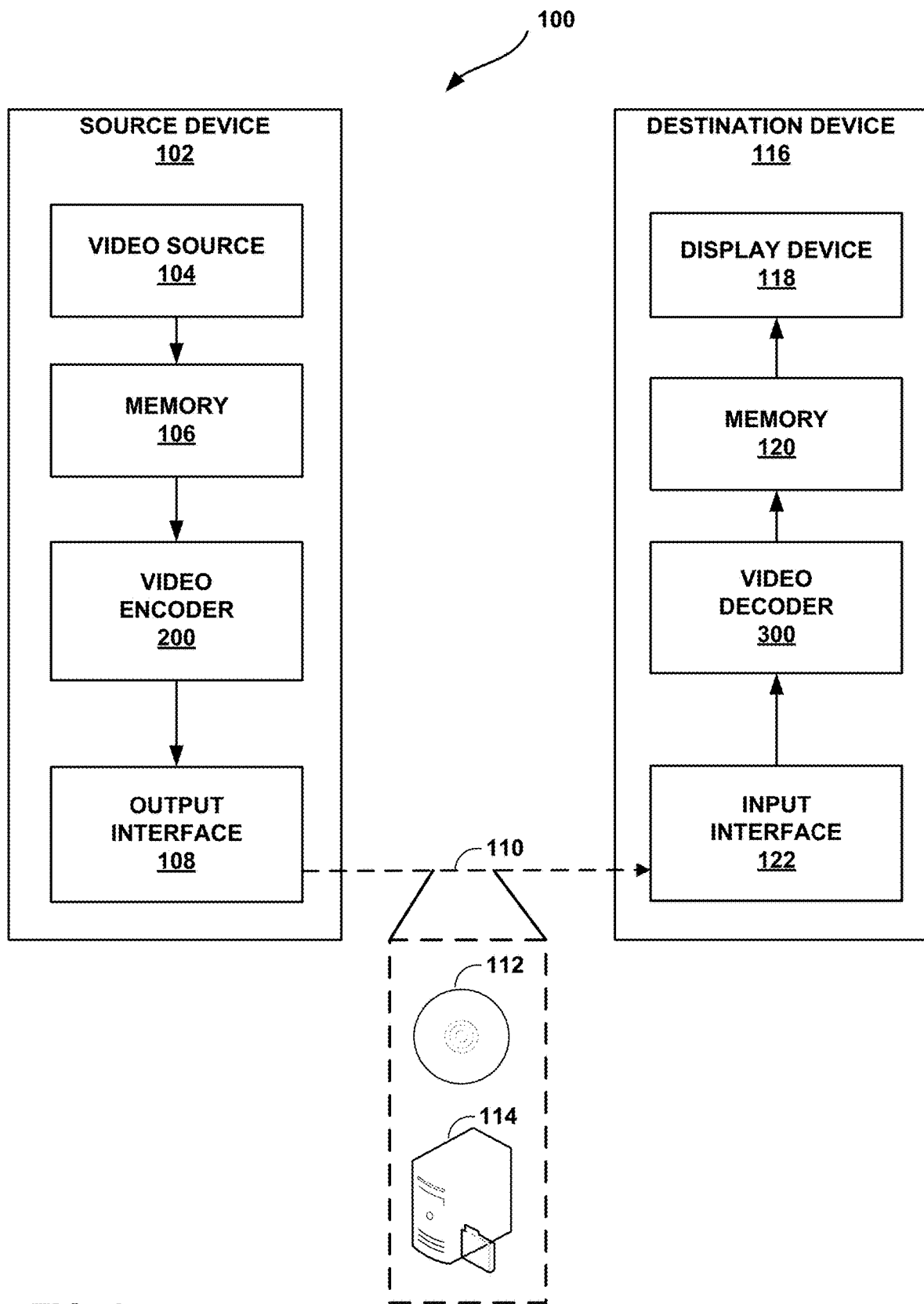
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for transform coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for transform coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 3)," Joint Video Experts Team (WET) of ITU-T SG 16 WP 3 and ISO/IEC JTC 1/SC 29/WG 11, 12$^{th}$ Meeting: Macao, CN, 3-12 Oct. 2018, JVET-L1001-v9 (hereinafter "VVC Draft 3). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra or inter prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to code a block of video data using one or more of a primary transform and a secondary transform according to the techniques of this disclosure described below.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
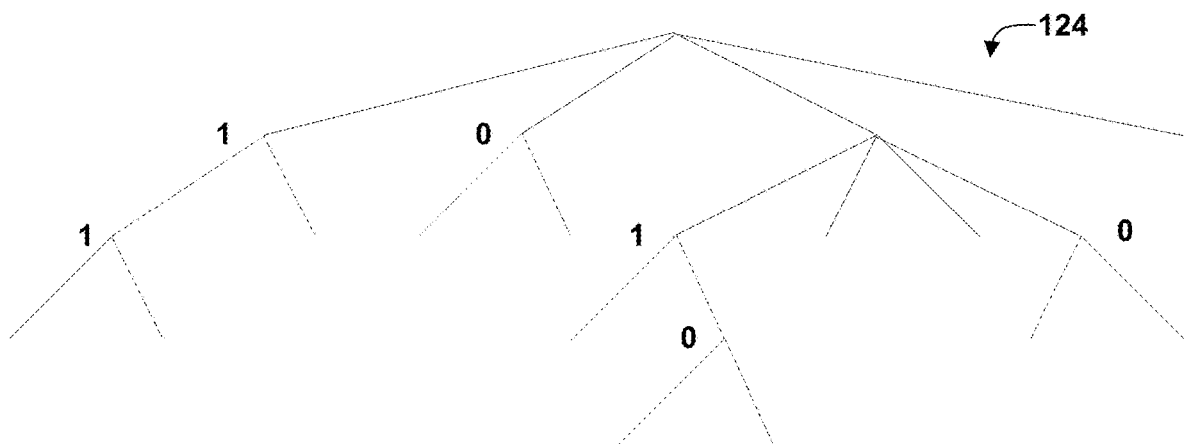
FIGS. 2A and 2B are conceptual diagrams illustrating an example quadtree binary tree (QTBT) structure, and a corresponding coding tree unit (CTU).
Figure 2B:
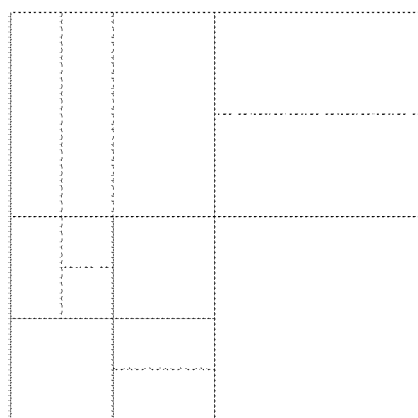

FIGS. 2A and 2B are conceptual diagram illustrating an example quadtree binary tree (QTBT) structure 124, and a corresponding coding tree unit (CTU) 126. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 124 (i.e., the solid lines) and syntax elements (such as splitting information) for a prediction tree level of QTBT structure 124 (i.e., the dashed lines). Video encoder 200 may encode, and video decoder 300 may decode, video data, such as prediction and transform data, for CUs represented by terminal leaf nodes of QTBT structure 124.

In general, CTU 126 of FIG. 2B may be associated with parameters defining sizes of blocks corresponding to nodes of QTBT structure 124 at the first and second levels. These parameters may include a CTU size (representing a size of CTU 126 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 124 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 124 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
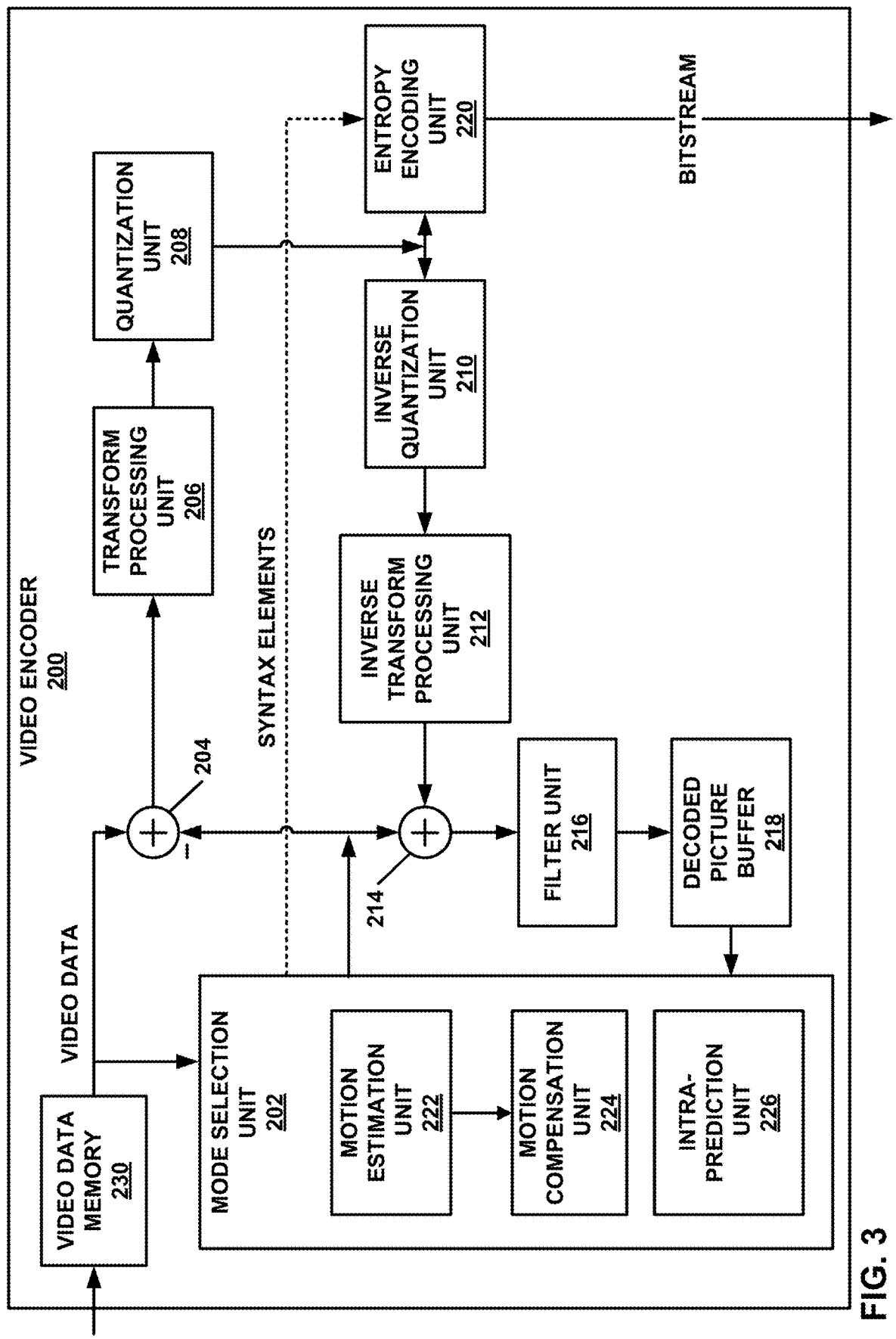
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter-prediction. Video encoder 200 and video decoder 300 may also support asymmetric partitioning for PU sizes of 2N×nU, 2N×nD, nL×2N, and nR×2N for inter-prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may apply multiple transforms to a residual block, e.g., a primary transform and a secondary transform, such as a rotational transform. In some examples, transform processing unit 206 may apply a primary transform and a secondary transform according to examples of this disclosure. For example, video encoder 200 may determine whether intra sub-partitioning is applied to a current block of video data. Video encoder 200 may also determine whether a primary transform size for the current block of video data is at least a predetermined size, e.g., 4×4, 8×8, 16×16 or any other predetermined size. Transform processing unit 206 of video encoder 200 may apply a secondary transform to primary transform coefficients based on intra sub-partitioning being applied and the primary transform size being at least the predetermined size. Video encoder 200 may encode the current block of the video data based on at least one of the primary transform coefficients and the secondary transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. For example, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and in communication with the memory and configured to determine whether intra sub-partitioning is applied to a current block of video data; apply a primary transform to the current block of video data to generate primary transform coefficients; based upon intra sub-partitioning being applied, determine whether a size of the primary transform is at least a predetermined size; based on intra sub-partitioning being applied and the size of the primary transform being at least the predetermined size, apply a secondary transform to the primary transform coefficients; and code the current block of the video data based on the secondary transform.

Figure 4:
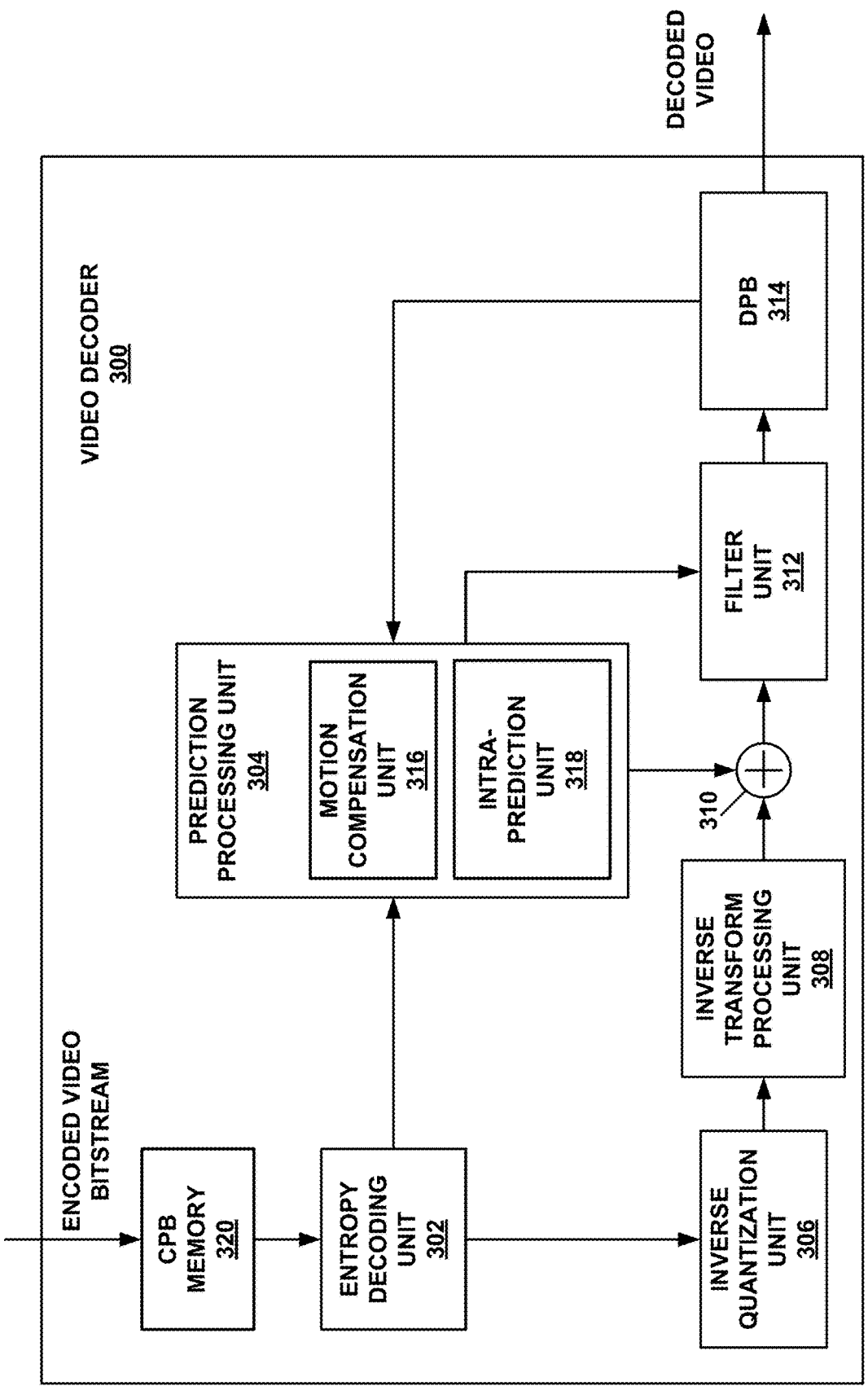
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block. In some examples, inverse transform processing unit 308 may apply a secondary inverse transform and a primary inverse transform according to techniques of this disclosure. For example, video decoder 300 may determine whether intra sub-partitioning is applied to a current block of video data. Video decoder 300 may also determine whether a primary transform size for the current block of video data is at least a predetermined size, e.g., 4×4, 8×8, 16×16 or any other predetermined size. Inverse transform processing unit 308 may apply an inverse secondary transform to inverse quantized data based on intra sub-partitioning being applied and the primary transform size being at least the predetermined size. Video decoder 300 may decode the current block of the video data based on at least one of the primary transform coefficients or the secondary transform.

Furthermore, prediction processing unit 304 generates a prediction block according to prediction information syntax elements, including prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine whether intra sub-partitioning is applied to a current block of video data; based upon intra sub-partitioning being applied, determine whether a size of an inverse primary transform is at least a predetermined size; based on intra sub-partitioning being applied and the size of the primary transform being at least the predetermined size, apply an inverse secondary transform coefficients; apply the inverse primary transform; and code the current block of the video data based on the inverse primary and inverse secondary transform.

In the following section, this disclosure provides an overview of discrete sine transforms and discrete cosine transforms (DCTs and DSTs). Also, the transform scheme used in HEVC standard is briefly discussed.

A particular transform defines the process of deriving an alternative representation of an input signal. Given an N-point vector $x=[x_0, x_1, \ldots, x_{N-1}]^T$ and a set of given vectors $\{\phi_0, \phi_1, \ldots, \phi_{M-1}\}$, x can be approximated or exactly represented using a linear combination of $\phi_0, \phi_1, \ldots, \phi_{M-1}$, which can be formulated as follows, $$\hat{x} = \Sigma_{i=0}^{M-1} f_i \cdot \phi_i,$$

where $\hat{x}$ can be an approximation or equivalent of x, vector $f=[f_1, f_2, \ldots, f_{M-1}]$ is the transform coefficient vector, and $\{\phi_0, \phi_1, \ldots, \phi_{M-1}\}$ are the transform basis vectors.

In video coding, transform coefficients are roughly non-correlated and sparse. In other words, the energy of the input vector x is compacted only on a few transform coefficients, and the remaining majority of transform coefficients are typically close to zero.

Given the specific input data, the optimal transform in terms of energy compaction is the KLT, which uses the eigen vectors of the covariance matrix of the input data as the transform basis vectors. Therefore, KLT is actually a data-dependent transform and does not have a general mathematical formulation. However, under certain assumptions, e.g., the input data forms a first-order stationary Markov process, it has been shown that the corresponding KLT is actually a member of the sinusoidal family of unitary transforms, which was introduced in Jain, A. K., A sinusoidal family of unitary transforms, IEEE Transactions on Pattern Analysis and Machine Intelligence, 1, 356, (1979). The sinusoidal family of unitary transforms indicates transforms using transform basis vectors formulated as follows:

$$\phi_m(k) = A \cdot e^{ike} + B \cdot e^{-ike},$$

where e is the base of the natural logarithm approximately equal to 2.71828, A, B, and Θ are complex in general, and depend on the value of m and k represents a frequency component.

Several well-known transforms, including the discrete Fourier, cosine, sine, and the KLT (for first-order stationary Markov processes), are members of this sinusoidal family of unitary transforms. According to the literature (e.g., S. A. Martucci, "Symmetric convolution and the discrete sine and cosine transforms," IEEE Trans. Sig. Processing SP-42, 1038-1051 (1994)), the complete set of discrete cosine transform (DCT) and discrete sine transform (DST) families includes, in total, 16 transforms based on different types, i.e., different values of A, B, and Θ. A complete definition of the different types of DCT and DST is given below.

Assume the input N-point vector is denoted as $x=[x_0, x_1, \ldots, x_{N-1}]^T$, and it is transformed to another N-point transform coefficient vector denoted as $y=[y_0, y_1, \ldots, y_{N-1}]^T$ by multiplying a matrix, the process of which can be further illustrated according to one of the following transform formulations, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $$w_0 = \begin{cases} \frac{1}{\sqrt{2}}, & \text{if } n = 0 \text{ or } n = N-1 \\ 1, & \text{otherwise} \end{cases},$$

$$w_1 = \begin{cases} \frac{1}{\sqrt{2}}, & \text{if } k = 0 \text{ or } k = N-1 \\ 1, & \text{otherwise} \end{cases}$$

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $w_0 = \begin{cases} \frac{1}{\sqrt{2}}, & \text{if } k = 0 \\ 1, & \text{otheriwse} \end{cases}$ DCT Type-III (DCT-3):

$$y_k = \sum_{n=0}^{N-1} \sqrt{\frac{2}{N}} \cos\left(\frac{\pi \cdot n \cdot (k+0.5)}{N-1}\right) \cdot w_0 \cdot x_n,$$

where $w_0 = \begin{cases} \frac{1}{\sqrt{2}}, & \text{if } n = 0 \\ 1, & \text{otheriwse} \end{cases}$ DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N-1}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = 0 \\ 1, & \text{otheriwse} \end{cases}$ DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = 0 \\ 1, & \text{otheriwse} \end{cases}$ DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otheriwse} \end{cases}$ DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otheriwse} \end{cases}$ DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \cos\left(\frac{\pi \cdot (n+05) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ The transform type is specified by the mathematical formulation of the transform basis function, e.g., 4-point DST-VII and 8-point DST-VII have the same transform type, regardless of the value of N.

All the above transform types may be represented using the below generalized formulation:

$$y_m = \sum_{n=0}^{N-1} T_{m,n} \cdot x_n,$$

where T is the transform matrix specified by the definition of one certain transform, e.g., DCT Type-I, DCT Type-VIII, DST Type-I, or DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

It is also noted that the above transform formulations, which are applied on the 1-D input data x, can be represented in matrix multiplication form as below $$y = T \cdot x,$$

where T indicates the transform matrix, x indicates the input data vector, and y indicates the output transform coefficients vector.

The transforms discussed above are applied on 1-D input data. Transforms can also be extended for 2-D input data sources. For example, define X as an input M×N data array. Example methods of applying a transform on 2-D input data include using the separable and non-separable 2-D transforms.

A separable 2-D transform applies 1-D transforms for the horizontal and vertical vectors of X sequentially, formulated as below:

$$Y = C \cdot X \cdot R^T,$$

where C and R denote the given M×M and N×N transform matrices, respectively.

From the formula above, it can be seen that C applies 1-D transforms for the column vectors of X, while R applies 1-D transforms for the row vectors of X. In the later part of this disclosure, for simplicity, denote C and R as left (vertical) and right (horizontal) transforms. Together they form a transform pair. There are cases when C is equal to R and is an orthogonal matrix. In such a case, the separable 2-D transform is determined by just one transform matrix. For example, video encoder 200 may apply a left (vertical) transform and a right (horizontal) transform to video data and in cases where C=R, video encoder 200 may apply one transform matrix. Video decoder 300 may apply the related inverse transform to reconstruct the video data.

A non-separable 2-D transform first reorganizes all the elements of X into a single vector, namely X', by doing the following mathematical mapping, as an example:

$$X'_{(i \cdot N+j)} = X_{i,j}$$

Then a 1-D transform T' is applied for X', as below:

$$Y = T' \cdot X,$$

where T' is an (M*N)×(M*N) transform matrix. For example, video encoder 200 may reorganize the elements of X into a single vector X' and apply the 1-D transform T' to X. In video coding, separable 2-D transforms are often applied since separable 2-D transforms require much fewer operation (e.g., addition, multiplication) counts as compared to 1-D transforms. For example, video encoder 200 may apply separable 2-D transforms because they require fewer operations.

In some example video codecs, such as those implementing H.264/AVC, an integer approximation of the 4-point and 8-point Discrete Cosine Transform (DCT) Type-II is applied for both intra and inter-prediction residuals. For example, video encoder 200 may apply an integer approximation of the 4-point and 8-point Discrete Cosine Transform (DCT) Type-II for both intra and inter-prediction residuals.

In order to better accommodate the various statistics of residual samples, more flexible types of transforms other than DCT Type-II are utilized in some new generation video codecs (e.g., HEVC and VVC). For example, in HEVC, an integer approximation of the 4-point Type-VII Discrete Sine Transform (DST) is utilized for intra-prediction residual. DST Type-VII is more efficient than DCT Type-II for residual vectors generated along the intra-prediction directions. For example, DST Type-VII is more efficient than DCT Type-II for row residual vectors generated by the horizontal intra-prediction direction. In HEVC, an integer approximation of 4-point DST Type-VII is applied only for 4×4 luma intra-prediction residual blocks. For example, video encoder 200 may apply an integer approximation of 4-point DST Type-VII only for 4×4 luma intra-prediction residual blocks. The 4-point DST-VII used in HEVC is shown below,

4×4 DST-VII:
{29, 55, 74, 84}
{74, 74, 0,−74}
{84,−29,−74, 55}
{55,−84, 74,−29}

In HEVC, for residual blocks that are not 4×4 luma intra-prediction residual blocks, integer approximations of the 4-point, 8-point, 16-point and 32-point DCT Type-II are also applied. For example, video encoder 200 may apply integer approximations of the 4-point, 8-point, 16-point and 32-point DCT Type-II for residual blocks that are not 4×4 luma intra-prediction residual blocks. The integer approximations of the 4-point, 8-point, 16-point and 32-point DCT Type-II are shown below:

4-point DCT-II:
{64, 64, 64, 64}
{83, 36,−36,−83}
{64,−64,−64, 64}
{36,−83, 83,−36}

8-point DCT-II:
{64, 64, 64, 64, 64, 64, 64, 64}
{89, 75, 50, 18,−18,−50,−75,−89}
{83, 36,−36,−83,−83,−36, 36, 83}
{75,−18,−89,−50, 50, 89, 18,−75}
{64,−64,−64, 64, 64,−64,−64, 64}
{50,−89, 18, 75,−75,−18, 89,−50}
{36,−83, 83,−36,−36, 83,−83, 36}
{18,−50, 75,−89, 89,−75, 50,−18}
16-point DCT-II:
{64, 64, 64, 64, 64, 64, 64, 64, 64, 64, 64, 64, 64, 64, 64, 64}
{90, 87, 80, 70, 57, 43, 25, 9, −9,−25,−43,−57,−70,−80,−87,−90}
{89, 75, 50, 18,−18,−50,−75,−89,−89,−75,−50,−18, 18, 50, 75, 89}
{87, 57, 9,−43,−80,−90,−70,−25, 25, 70, 90, 80, 43, −9,−57,−87}
{83, 36,−36,−83,−83,−36, 36, 83, 83, 36,−36,−83,−83,−36, 36, 83}
{80, 9,−70,−87,−25, 57, 90, 43,−43,−90,−57, 25, 87, 70, −9,−80}
{75,−18,−89,−50, 50, 89, 18,−75,−75, 18, 89, 50,−50,−89,−18, 75}
{70,−43,−87, 9, 90, 25,−80,−57, 57, 80,−25,−90, −9, 87, 43,−70}
{64,−64,−64, 64, 64,−64,−64, 64, 64,−64,−64, 64, 64,−64,−64, 64}
{57,−80,−25, 90, −9,−87, 43, 70,−70,−43, 87, 9,−90, 25, 80,−57}
{50,−89, 18, 75,−75,−18, 89,−50,−50, 89,−18,−75, 75, 18,−89, 50}
{43,−90, 57, 25,−87, 70, 9,−80, 80, −9,−70, 87,−25,−57, 90,−43}
{36,−83, 83,−36,−36, 83,−83, 36, 36,−83, 83,−36,−36, 83,−83, 36}
{25,−70, 90,−80, 43, 9,−57, 87,−87, 57, −9,−43, 80,−90, 70,−25}
{18,−50, 75,−89, 89,−75, 50,−18,−18, 50,−75, 89,−89, 75,−50, 18}
{9, −25, 43,−57, 70,−80, 87,−90, 90,−87, 80,−70, 57,−43, 25, −9}
32-point DCT-II:
{64,64,64,64,64,64,64,64,64,64,64,64,64,64,64,64,64,64,64,64,64,64,64,64,6 4,64,64,64,64,64,64}
{90,90,88,85,82,78,73,67,61,54,46,38,31,22,13,4,−4,−13,−22,−31,−38,−46,−54,−61,−67,−73,−78,−82,−85,−88,−90,−90}
{90,87,80,70,57,43,25,9,−9,−25,−43,−57,−70,−80,−87,−90,−90,−87,−80,−70,−57,−43,−25,−9,9,25,43,57,70,80,87,90}
{90,82,67,46,22,−4,−31,−54,−73,−85,−90,−88,−78,−61,−38,−13,13,38,61,78,88,90,85,73,54,31,4,−22,−46,−67,−82,−90}
{89,75,50,18,−18,−50,−75,−89,−89,−75,−50,−18,18,50,75,89,89,75,50,18,−18,−50,−75,−89,−89,−75,−50,−18,18,50,75,89}
{88,67,31,−13,−54,−82,−90,−78,−46,−4,38,73,90,85,61,22,−22,−61,−85,−90,−73,−38,4,46,78,90,82,54,13,−31,−67,−88}
{87,57,9,−43,−80,−90,−70,−25,25,70,90,80,43,−9,−57,−87,−87,−57,−9,43,80,90,70,25,−25,−70,−90,−80,−43,9,57,87}
{85,46,−13,−67,−90,−73,−22,38,82,88,54,−4,−61,−90,−78,−31,31,78,90,61,4,−54,−88,−82,−38,22,73,90,67,13,−46,−85}
{83,36,−36,−83,−83,−36,36,83,83,36,−36,−83,−83,−36,36,83,83,36,−36,−83,−83,−36,36,83,83,36,−36,−83,−83,−36,36,83}
{82,22,−54,−90,−61,13,78,85,31,−46,−90,−67,4,73,88,38,−38,−88,−73,−4,67,90,46,−31,−85,−78,−13,61,90,54,−22,−82}
{80,9,−70,−87,−25,57,90,43,−43,−90,−57,25,87,70,−9,−80,−80,−9,70,87,25,−57,−90,−43,43,90,57,−25,−87,−70,9,80}
{78,−4,−82,−73,13,85,67,−22,−88,−61,31,90,54,−38,−90,−46,46,90,38,−54,−90,−31,61,88,22,−67,−85,−13,73,82,4,−78}
{75,−18,−89,−50,50,89,18,−75,−75,18,89,50,−50,−89,−18,75,75,−18,−89,−50,50,89,18,−75,−75,18,89,50,−50,−89,−18,75}
{73,−31,−90,−22,78,67,−38,−90,−13,82,61,−46,−88,−4,85,54,−54,−85,4,88,46,−61,−82,13,90,38,−67,−78,22,90,31,−73}
{70,−43,−87,9,90,25,−80,−57,57,80,−25,−90,−9,87,43,−70,−70,43,87,−9,−90,−25,80,57,−57,−80,25,90,9,−87,−43,70}
{67,−54,−78,38,85,−22,−90,4,90,13,−88,−31,82,46,−73,−61,61,73,−46,−82,31,88,−13,−90,−4,90,22,−85,−38,78,54,−67}
{64,−64,−64,64,64,−64,−64,64,64,−64,−64,64,64,−64,−64,64,64,−64,−64,64,64,−64,−64,64,64,−64,−64,64,64,−64,−64,64}
{61,−73,−46,82,31,−88,−13,90,−4,−90,22,85,−38,−78,54,67,−67,−54,78,38,−85,−22,90,4,−90,13,88,−31,−82,46,73,−61}
{57,−80,−25,90,−9,−87,43,70,−70,−43,87,9,−90,25,80,−57,−57,80,25,−90,9,87,−43,−70,70,43,−87,−9,90,−25,−80,57}
{54,−85,−4,88,−46,−61,82,13,−90,38,67,−78,−22,90,−31,−73,73,31,−90,22,78,−67,−38,90,−13,−82,61,46,−88,4,85,−54}
{50,−89,18,75,−75,−18,89,−50,−50,89,−18,−75,75,18,−89,50,50,−89,18,75,−75,−18,89,−50,−50,89,−18,−75,75,18,−89,50}
{46,−90,38,54,−90,31,61,−88,22,67,−85,13,73,−82,4,78,−78,−4,82,−73,−13,85,−67,−22,88,−61,−31,90,−54,−38,90,−46}
{43,−90,57,25,−87,70,9,−80,80,−9,−70,87,−25,−57,90,−43,−43,90,−57,−25,87,−70,−9,80,−80,9,70,−87,25,57,−90,43}
{38,−88,73,−4,−67,90,−46,−31,85,−78,13,61,−90,54,22,−82,82,−22,−54,90,−61,−13,78,−85,31,46,−90,67,4,−73,88,−38}
{36,−83,83,−36,−36,83,−83,36,36,−83,83,−36,−36,83,−83,36,36,−83,83,−36,−36,83,−83,36,36,−83,83,−36,−36,83,−83,36}
{31,−78,90,−61,4,54,−88,82,−38,−22,73,−90,67,−13,−46,85,−85,46,13,−67,90,−73,22,38,−82,88,−54,−4,61,−90,78,−31}
{25,−70,90,−80,43,9,−57,87,−87,57,−9,−43,80,−90,70,−25,−25,70,−90,80,−43,−9,57,−87,87,−57,9,43,−80,90,−70,25}
{22,−61,85,−90,73,−38,−4,46,−78,90,−82,54,−13,−31,67,−88,88,−67,31,13,−54,82,−90,78,−46,4,38,−73,90,−85,61,−22}
{18,−50,75,−89,89,−75,50,−18,−18,50,−75,89,−89,75,−50,18,18,−50,75,−89,89,−75,50,−18,−18,50,−75,89,−89,75,−50,18}
{ 13,−38,61,−78,88,−90,85,−73,54,−31,4,22,−46,67,−82,90,−90,82,−67,46,−22,−4,31,−54,73,−85,90,−88,78,−61,38,−13}

{9,−25,43,−57,70,−80,87,−90,90,−87,80,−70,57,−43, 25,−9,−9,25,−43,57,−70,80,−87,90,−90,87,−80,70,−57,43,− 25,9}

{4,−13,22,−31,38,−46,54,−61,67,−73,78,−82,85,−88, 90,−90,90,−90,88,−85,82,−78,73,−67,61,−54,46,−38,31,− 22,13,−4}

To adapt the various characteristics of the residual blocks, a transform coding structure using the RQT is applied in HEVC. In RQT, video encoder 200 may divide each picture into CTUs, which are coded in raster scan order for a specific tile or slice. A CTU is a square block and represents the root of a quadtree, i.e., the coding tree. The CTU size may range from 8×8 to 64×64 luma samples, but is typically 64×64. Each CTU can be further split into smaller square blocks called CUs. After the CTU is split recursively into CUs, each CU is further divided into PUs and TUs. The partitioning of a CU into TUs is carried out recursively based on a quadtree approach. Therefore, the residual signal of each CU is coded by a tree structure namely, the RQT. The RQT allows TU sizes from 4×4 up to 32×32 luma samples.

Figure 5:
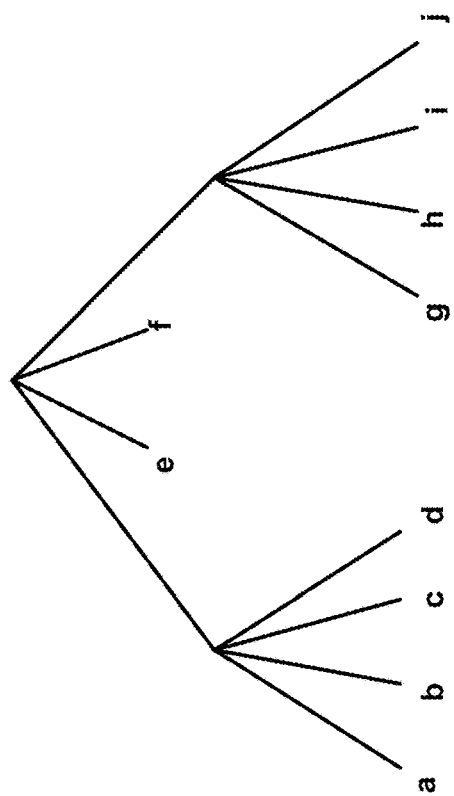
FIG. 5 is a conceptual diagram illustrating a transform scheme based on a residual quadtree partitioning structure.
Figure 5:
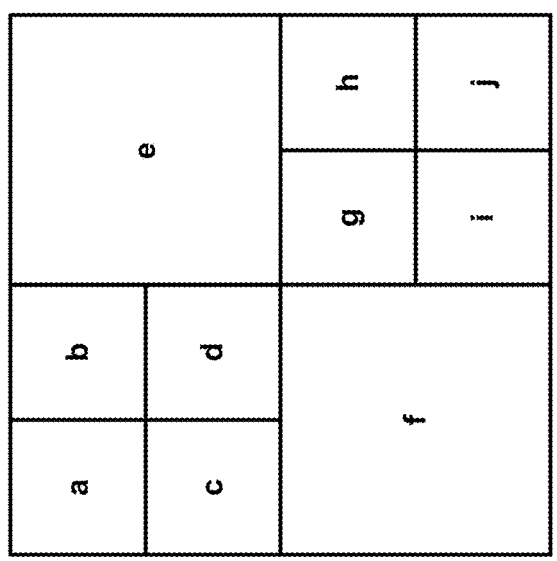

FIG. 5 shows an example where a CU includes 10 TUs, labeled with the letters a to j, and the corresponding block partitioning. Each node of the RQT is actually a TU. The individual TUs are processed in depth-first tree traversal order (which are illustrated in FIG. 5 in alphabetical order) which follows a recursive Z-scan with depth-first traversal. The quadtree approach enables the adaptation of the transform to the varying space-frequency characteristics of the residual signal.

Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example, based on rate-distortion optimization technique. For example, mode selection unit 202 of video encoder 200 may determine to use larger transform block sizes to provide better frequency resolution or may determine to use smaller transform block sizes to provide better spatial resolution by performing a rate-distortion optimization technique. Mode selection unit 202 of video encoder 200 may utilize a rate-distortion optimization technique that may calculate a weighted sum of coding bits and reconstruction distortion, i.e., the rate-distortion cost, for each coding mode (e.g., a specific RQT splitting structure), and select the coding mode with least rate-distortion cost as the best mode.

Three parameters may be defined in the RQT: the maximum depth of the tree, the minimum allowed transform size, and the maximum allowed transform size. The minimum and maximum transform sizes can vary within the range from 4×4 to 32×32 samples, which correspond to the supported block transforms mentioned in the previous paragraphs. The maximum allowed depth of the RQT restricts the number of TUs. A maximum depth equal to zero means that a CB cannot be split any further if each included transform block (TB) reaches the maximum allowed transform size, e.g., 32×32.

All of these parameters may interact and influence the RQT structure. Consider a case in which the root CB size is 64×64, the maximum depth is equal to zero and the maximum transform size is equal to 32×32. In this case, the CB has to be partitioned at least once, since otherwise it would lead to a 64×64 TB, which is not allowed in HEVC. The RQT parameters, i.e., maximum RQT depth, minimum and maximum transform size, are transmitted in the bitstream at the SPS level. For example, video encoder 200 may transmit the RQT parameters in the SPS and video decoder 300 may determine the RQT parameters by reading the RQT parameters in the SPS. Regarding the RQT depth, different values can be specified and signaled for intra and inter coded CUs. For example, video encoder 200 may signal different values for RQT depth for intra and inter coded CUs.

The quadtree transform may be applied for both intra and inter residual blocks. Typically, the DCT-II transform of the same size of the current residual quadtree partition is applied for a residual block. For example, video encoder 200 may apply a DCT-II transform of the same size of the current residual quadtree partition for a residual block. However, if the current residual quadtree block is 4×4 and is generated by intra-prediction, the above 4×4 DST-VII transform may be applied.

In HEVC, larger size transforms, e.g., 64×64 transform are not adopted mainly due to their limited benefit and relatively high complexity for relatively smaller resolution videos.

Figure 6:
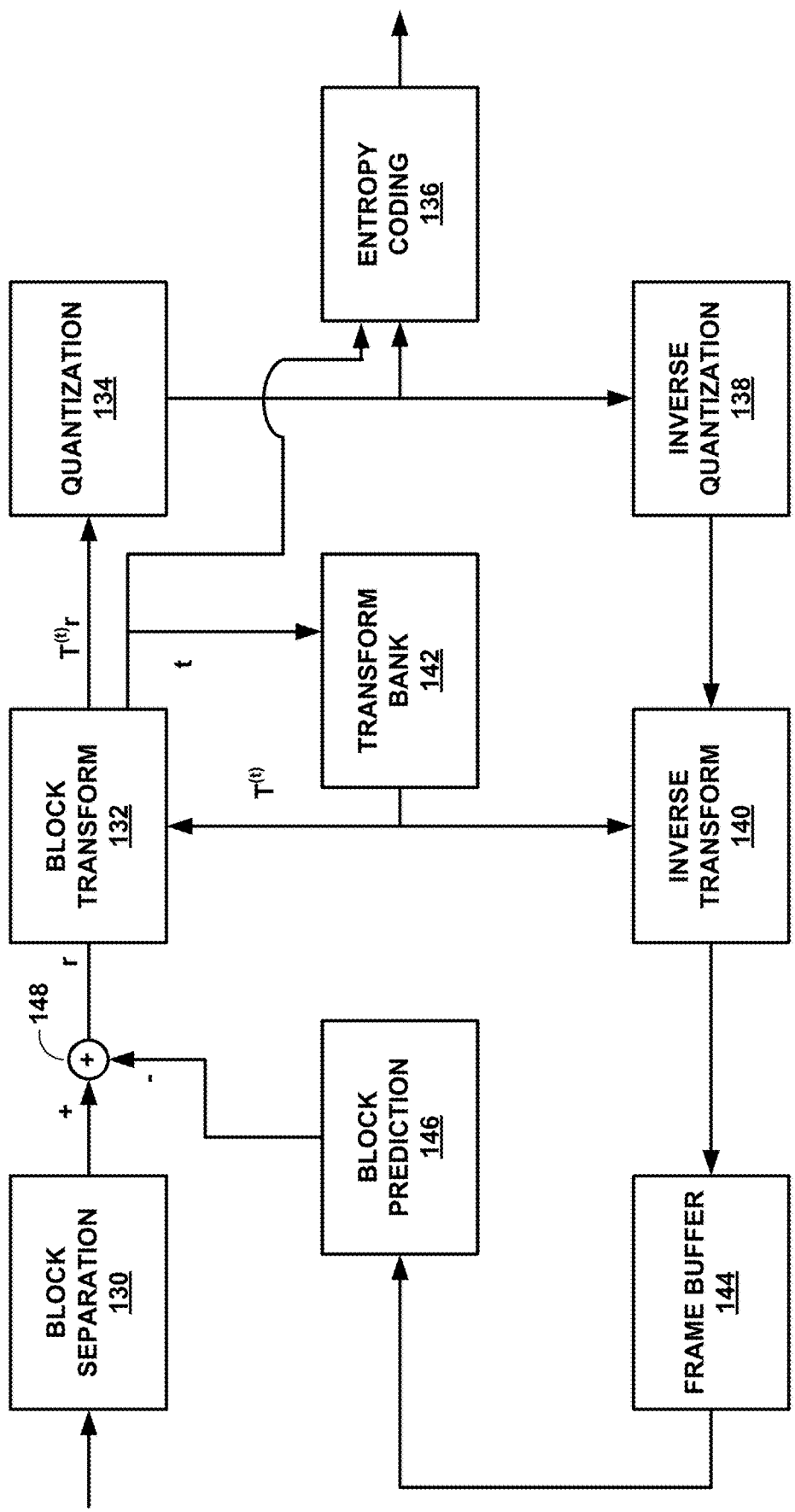
FIG. 6 is a block diagram illustrating an example hybrid video encoding system with adaptive transform selection.

The techniques of this disclosure are applicable to a typical adaptive transform coding scheme shown in FIG. 6. Video encoder 200 of FIG. 3 may be configured to operate using the adaptive transform coding scheme shown in FIG. 6. The video encoder of FIG. 6 includes block separation unit 130, residual generation unit 148, block transform unit 132, quantization unit 134, entropy coding unit 136, inverse quantization unit 138, inverse transform unit 140, frame buffer 144, block prediction unit 146 and transform bank unit 142. For example, block separation unit 130 may provide a block of video data to residual generation unit 148. Residual generation unit 148 may accept the block of video data and prediction information from block prediction unit 146 and generate a residual r. Block transform unit 132 may select a transform t from transform bank unit 142 and may signal the selected transform in a bitstream output from entropy coding unit 136. Block transform unit 132 may apply the selected transform from transform bank unit 142 to create transform coefficients $T^{(t)}r$. In some example, block transform unit 132 may apply a secondary transform (which may also be in transform bank unit 142) after applying a primary transform. The transform coefficients may be provided to quantization unit 134. Quantization unit 134 may quantize the transform coefficients and provide quantized transform coefficients to entropy coding unit 136 and to inverse quantization unit 138. Entropy coding unit 136 may entropy encode quantized transform coefficients and output entropy coded information to a bitstream. Inverse quantization unit 138 may inverse quantize the quantized transform coefficients to recreate the transform coefficients and provide the transform coefficients to invers transform unit 140. Inverse transform unit 140 may inverse transform the transform coefficients and provide video data to frame buffer 144. Frame buffer 144 may provide video data to block prediction unit 146 which may predict a current block of video data.

In FIG. 6, for each block of prediction residuals, video encoder 200 may choose different transforms from transform bank unit 142. Video encoder 200 may encode the choice of transform as side information for signaling. For example, video encoder 200 may signal the choice of transform and video decoder 300 may determine the choice of transform by reading the signal.

In video coding standards prior to HEVC, only a fixed separable transform is used where DCT-2 is used both vertically and horizontally. In HEVC, in addition to DCT-2, DST-7 is also employed for 4×4 blocks as a fixed separable transform. U.S. Patent Publication No. 2016/0219290, published Jul. 28, 2016, U.S. Patent Publication No. 2018/

0020218, published Jan. 18, 2018, and U.S. Provisional Patent Application No. 62/679,570, filed Jun. 1, 2018, the entire content of each of which is incorporated by reference herein, describe adaptive extensions of those fixed transforms, and an example of adaptive multiple transforms (AMT) described in X. Zhao, S. Lee, J. Chen, L. Zhang, X. Li, Y. Chen, M. Karczewicz, and H. Liu, "Enhanced Multiple Transforms for Prediction Residuals," January 2015 has been adopted in the Joint Experimental Model (JEM-7.0) of the Joint Video Experts Team (JVET) (e.g., see Joint Video Experts Team (JVET) of ITU-T SG 16 WP 3 and ISO/IEC JTC 1/SC 29/WG 11, JEM Software). A simplified version of AMT, called multiple transform selection (MTS), is also adopted in VVC. Moreover, secondary transforms are used in JEM-7.0 to further improve the coding efficiency, where the implementation is based the Hypercube-Givens Transform (HyGT) described in U.S. Patent Publication No. 2017/0238013, published Aug. 17, 2017 (see also U.S. Patent Publication No. 2017/0094313, published Mar. 30, 2017, U.S. Patent Publication No. 2017/0094314, published Mar. 30, 2017, U.S. Patent Publication No. 2017/0238014, published Aug. 17, 2017, U.S. Provisional Patent Application No. 62/668,105, filed May 7, 2018, and U.S. Provisional Patent Application No. 62/648,321, filed Mar. 26, 2018, the entire content of each of which is incorporated by reference herein, for alternative designs of secondary transforms and further details). For the VVC standard, secondary transforms are still being studied and there is a possibility of adoption into the VVC standard in subsequent JVET meeting cycles.

In a recent JVET meeting, a partitioning method for TUs has been adopted in VVC (which will be available in VTM-4.0 reference software), where intra coded TU blocks can be further partitioned horizontally or vertically depending on the intra-prediction mode and block size (referred to herein as intra sub-partitioning). In the adopted method, multiple horizontal/vertical partitions are allowed, and a TU can be of size 1×16 and 16×1. However, existing secondary transform designs (including the one in JEM-7.0) implicitly assume that the smallest TU size is 4×4, so with current secondary transform designs, secondary transforms may not be applied to TUs of certain sizes, including 1×16, 16×1, 2×8 and 8×2.

The techniques of this disclosure may permit secondary transforms to be applied to TUs of sizes 1×16, 16×1, 2×8 and 8×2 in order to achieve better coding gains.

Figure 7:
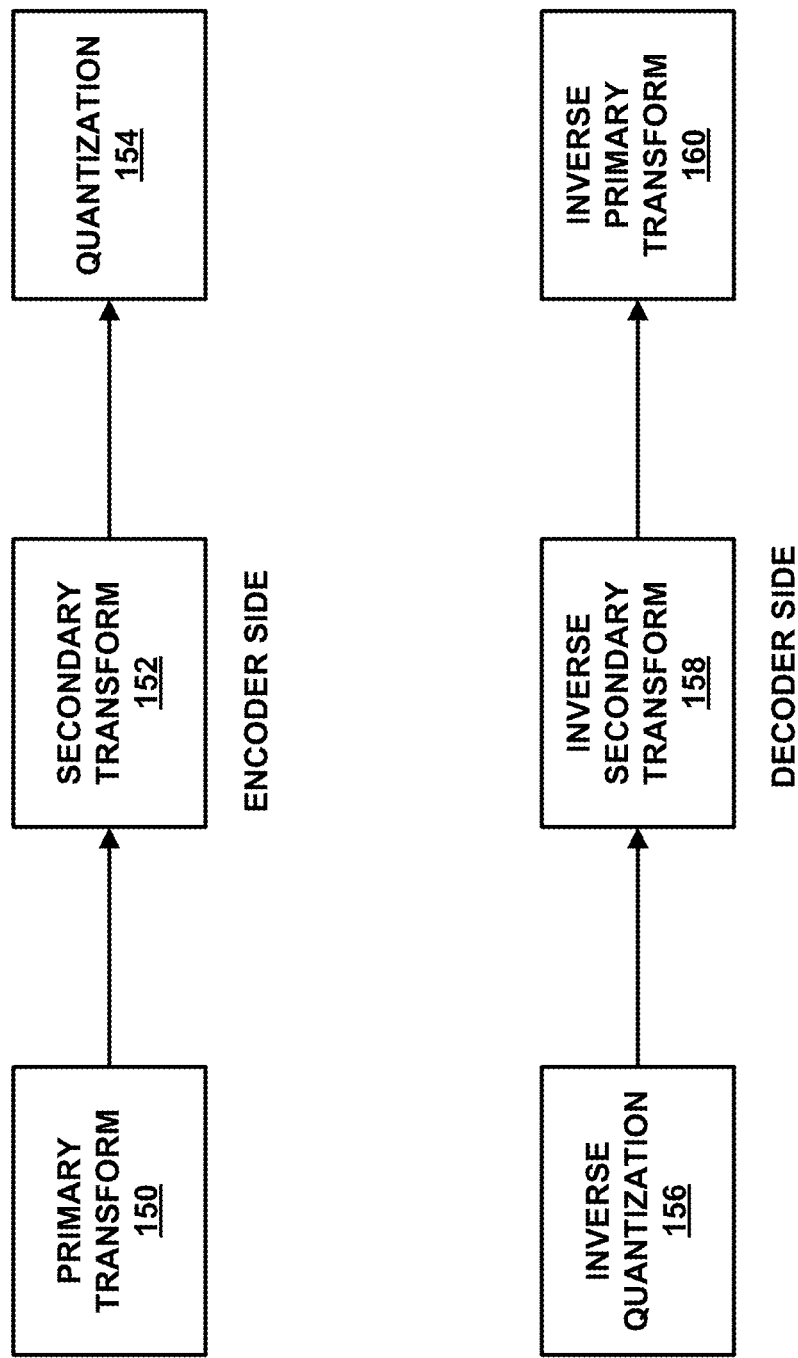
FIG. 7 is a block diagram illustrating the use of a secondary transforms at an encoder and a decoder.

This disclosure describes secondary transform designs that may be applied to any encoder/decoder (e.g., video encoder 200 and video decoder 300) supporting various TU (block) sizes (e.g., 1×16, 16×1, 2×8, 8×2). The techniques described below may be used individually or in any combination with each other. FIG. 7 is a block diagram illustrating the use of secondary transforms at the encoder and decoder sides. For example, video encoder 200 may apply a primary transform (150), a secondary transform (152) and quantize (154) video data. Transform processing unit 206 of video encoder 200 may apply the primary transform and secondary transform to the video data and quantization unit 208 may quantize the transform coefficients. Video decoder 300 may inverse quantize (156), inverse secondary transform (158) and inverse primary transform (160) video data received in a bitstream. Inverse quantization unit 306 of video decoder 300 may inverse quantize video data in a bitstream and inverse transform processing unit 308 of video decoder 300 may apply a secondary inverse transform and a primary inverse transform to the inverse quantized video data.

In one example of the present disclosure, a secondary transform is not applied when intra sub-partitioning is applied to the block. In this case, secondary transform overhead may not be signaled. For example, video encoder 200 may not apply a secondary transform to a block when video encoder 200 applies intra sub-partitioning to the block. In this example, video encoder 200 may not signal secondary transform overhead and video decoder 300 may not read secondary transform overhead signaling. In other words, intra sub-partitioning and secondary transforms may not be used together.

In another example of the disclosure, a secondary transform may be applied to the totality of primary transform coefficients regardless of the intra sub-partitioning method. That is, a primary transform is applied to all sub-blocks and the secondary transform is applied to the primary transform coefficients. In this case, the secondary transform is applied across primary transform blocks or may be applied only to the part of the multiple primary transform blocks. For example, video encoder 200 may apply a secondary transform across all primary transform blocks or to less than all of the primary transform blocks.

In another example of the disclosure, video encoder 200 may apply a secondary transform to a subset of coefficients obtained from a primary transform (such as primary transforms defined by AMT/MTS). In this example, video decoder 300 applies the inverse secondary transform first, and then applies the inverse primary transform. As mentioned above, FIG. 7 illustrates the secondary transformation scheme for both a video encoder and video decoder, such as video encoder 200 and video decoder 300.

In another example of the disclosure, a secondary transform of size K can be implemented based on matrix multiplication, HyGT or hierarchical factorizations as described in U.S. Patent Publication No. 2017/0094313, published Mar. 30, 2017, U.S. Patent Publication No. 2017/0094314, published Mar. 30, 2017, U.S. Patent Publication No. 2017/0238014, published Aug. 17, 2017, U.S. Provisional Patent Application No. 62/668,105, filed May 7, 2018, and U.S. Provisional Patent Application No. 62/648,321, filed Mar. 26, 2018. For example, video encoder 200 may apply a secondary transform of size K to the primary transform coefficients.

In another example of the disclosure, a secondary transform can be a separable transform or non-separable transform. For example, video encoder 200 may apply a separable secondary transform to the primary transform coefficients. In other examples, video encoder 200 may apply a non-separable secondary transform to the primary transform coefficients.

In another example of the disclosure, a secondary transform may not be applied if TU partitioning is used or signaled. For example, a secondary transform may be used if TU size is the same as CU size. For example, video encoder 200 may not use a secondary transform if video encoder 200 uses TU partitioning on a given CU and may use a secondary transform if video encoder 200 does not use TU partitioning on a given CU.

In other examples of the disclosure, a secondary transform may be applied whether a TU is partitioned or not. The following are specific examples where video encoder 200 may apply a secondary transform whether a TU is partitioned or not.

For example, if a TU is not partitioned, a secondary transform may be applied to a subset of samples. For example, video encoder 200 may apply a secondary transform to a subset of samples if a given TU is not partitioned.

Examples include the designs described in U.S. patent application Ser. No. 16/020,511, filed Jun. 27, 2018. As another example, the secondary transform in JEM-7.0 may be applied for the cases where a TU size is the same as CU size. For example, video encoder 200 may apply the secondary transform described in JEM-7.0 when the TU size is the same as the CU size.

Figure 8:
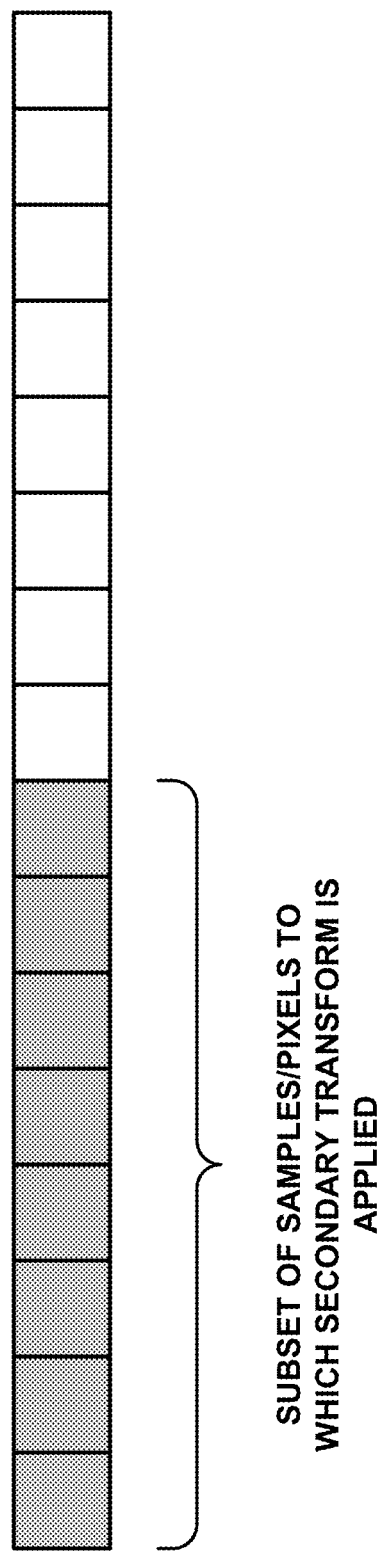
FIG. 8 is a conceptual diagram illustrating an example secondary transform for a 1×16 block.

In another example, if a partition leads to a TU of size 1×N or N×1, where N>1, a secondary transform may be applied to a subset of N samples/pixels, denoted by K<N. FIG. 8 shows an example where N=16 and K=8, where the subset of samples/pixels is represented by the shaded boxes. For example, video encoder 200 may apply a secondary transform to a subset of N samples/pixels if a partition leads to a TU of size 1×N or N×1.

Figure 9:
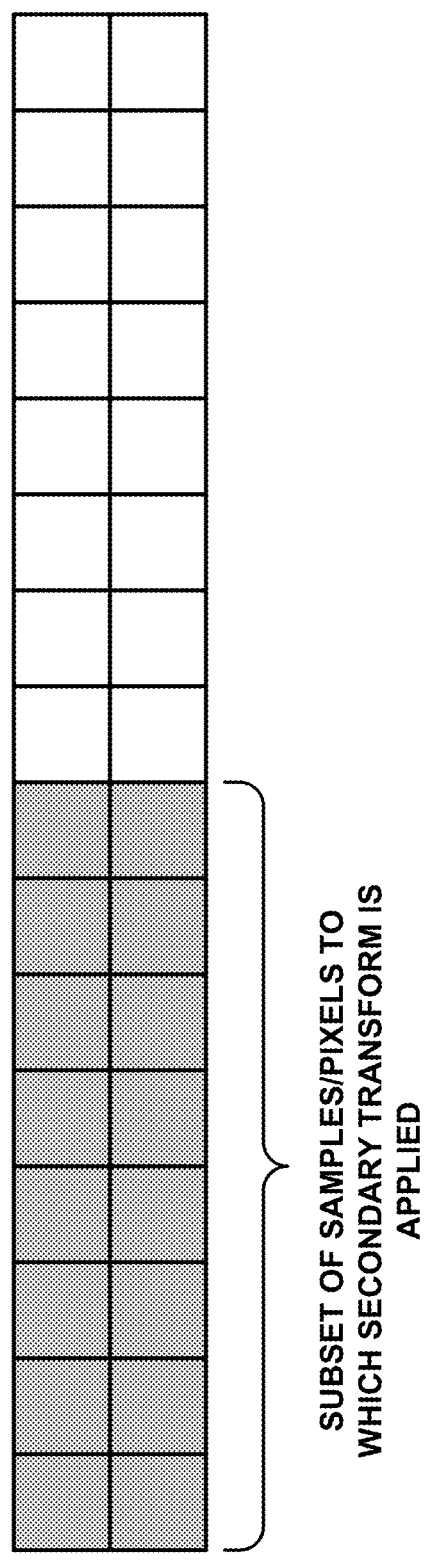
FIG. 9 is a conceptual diagram illustrating an example secondary transform for a 2×16 block.
Figure 10:
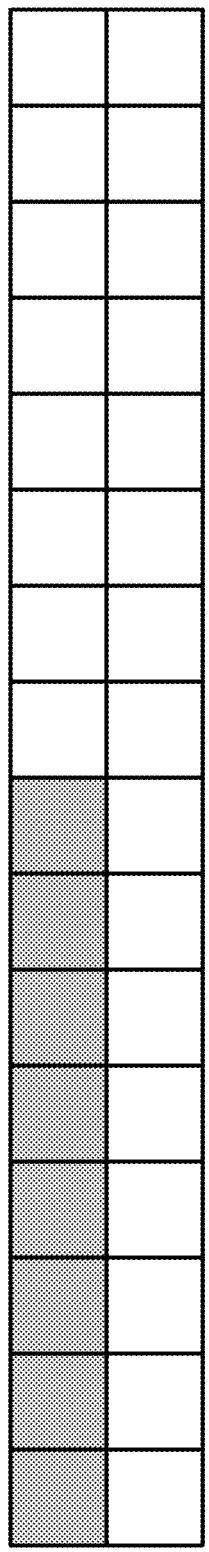
FIG. 10 is a conceptual diagram illustrating two example secondary transforms for a 2×16 block.
Figure 10:
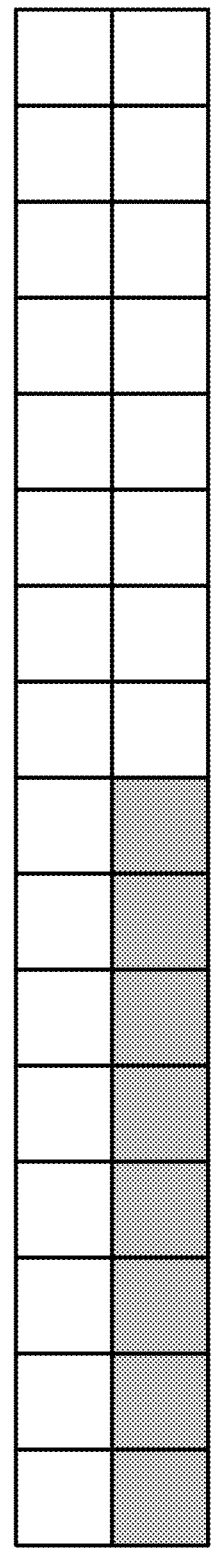

In another example, if a partition leads to a TU of size 2×N or 2×N, where N>2, a secondary transform may be applied to a subset of 2N samples/pixels, denoted by K<2N. FIG. 9 shows an example where 2N=32 and K=16, where the subset of samples/pixels is represented by the shaded boxes. FIG. 10 shows two examples where 2N=32 and K=8, where the subset of samples/pixels is represented by the shaded boxes. For example, video encoder 200 may apply a secondary transform to a subset of 2N samples/pixels if a partition leads to a TU of size 2×N or N×2.

In another example of the disclosure, a secondary transform may be applied to the K-lowest frequency coefficients obtained from a primary transform. For example, video encoder 200 may apply a secondary transform to the K-lowest frequency coefficients obtained from a primary transform, where K is an integer.

In another example of the disclosure, a secondary transform may be applied to any subset of samples obtained from a primary transform. For example, video encoder 200 may apply a secondary transform to any subset of samples obtained from a primary transform.

Figure 11:
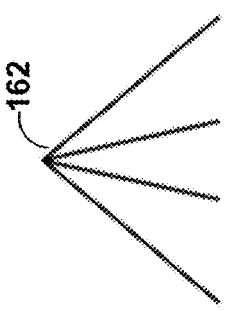
FIG. 11 is a conceptual diagram illustrating different types of tree-based partitioning of a square block.
Figure 11:
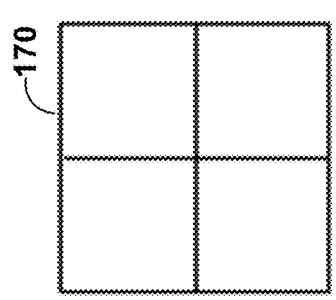
Figure 11:
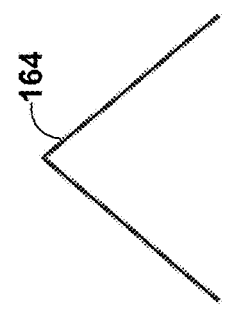
Figure 11:
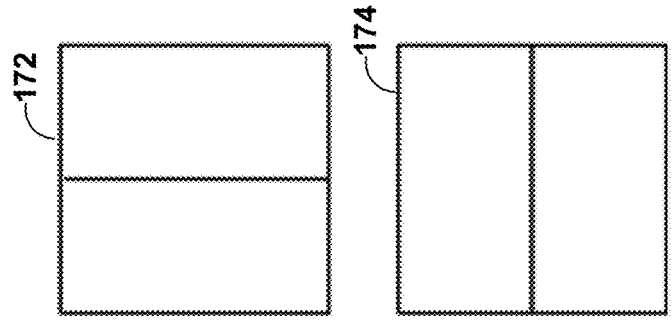
Figure 11:
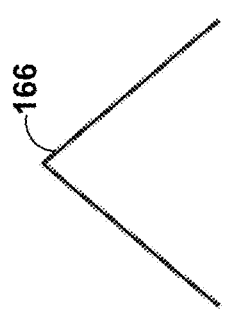
Figure 11:
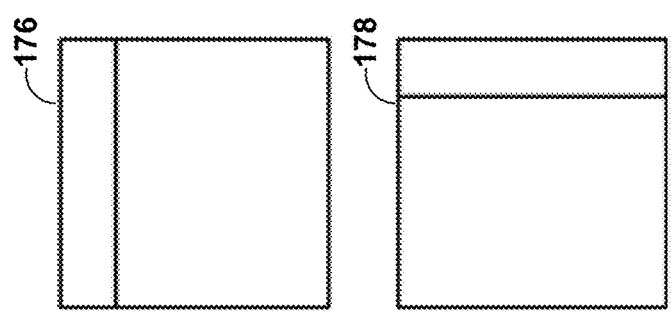
Figure 11:
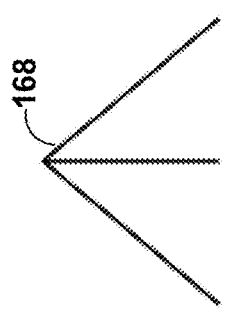
Figure 11:
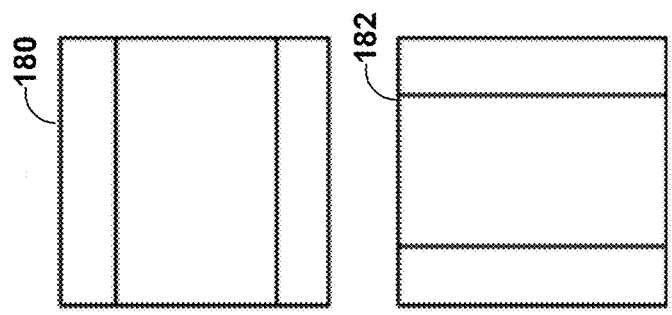

In another example of the disclosure, a secondary transform may be applied to a certain type of partition or types of partitions. For example, a secondary transform may be applied if a partition is obtained based on a binary-tree or quad-tree. In some examples, if the partition is defined based on a triple-tree, a secondary transform may not be allowed (see FIG. 11 for examples of tree-based partitions). FIG. 11 shows different types of tree-based partitioning on a square block. For example, quad-tree partition 162 is depicted with its example corresponding CTU 170, binary-tree partition 164 is depicted with example corresponding CTUs (CTU 172 and CTU 174), binary-tree partition 166 is depicted with example corresponding CTUs (CTU 176 and CTU 178) and triple-tree partition 168 is depicted with example corresponding CTUs (CTU 180 and CTU 182). For example, video encoder 200 may apply a secondary transform if a partition is a binary-tree partition or a quad-tree partition, but not apply a secondary transform if the partition a triple-tree partition.

In some examples, one technique or combinations of the above techniques may be used for intra-predicted CUs only. For example, video encoder 200 may apply any of the above techniques only for intra-predicted CUs.

In some examples, one technique or combinations of the above techniques may be used for inter-predicted CUs only. For example, video encoder 200 may apply any of the above techniques only for inter-predicted CUs.

In some examples, one technique or combinations of the above techniques may be used for both intra and inter predicted CUs. For example, video encoder 200 may apply any of the above techniques for both intra and inter predicted CUs.

In some examples, one technique or combinations of the above techniques may be used for luma channels or chroma channels or both. For example, video encoder 200 may apply any of the above techniques for luma channels, chroma channels or both.

In another example of the disclosure, for the intra sub-partitioning mode, the primary transform size (width× height) may be a multiple of 16, so the transform block can be rearranged before applying a secondary transform. For example, 1×16 or 16×1 primary transform coefficients may be rearranged into 4×4 coefficient block before applying a secondary transform. For example, video encoder 200 may restrict a primary transform size to a multiple of 16. In the case of 1×16 or 16×1 primary transform coefficients, video encoder 200 may rearrange primary transform coefficients into a 4×4 coefficient block and then apply a secondary transform. Various methods may be used to rearrange the block, such as various scanning patterns. The rearranging method may depend on the intra sub-partitioning block size and/or intra mode.

In the other alternatives, secondary transforms may be applied only if the primary transform size is at least a predetermined size, such as 4×4, 8×8, 16×16 or any other predetermined size, in the intra sub-partitioning method. Otherwise, a secondary transform may not be applied, and secondary transform overhead may not be signaled. For example, video encoder 200 may apply a secondary transform only if the primary transform size is at least 4×4 and if the primary transform size is not at least 4×4, video encoder 200 may not apply a secondary transform or signal secondary transform overhead.

Figure 12:
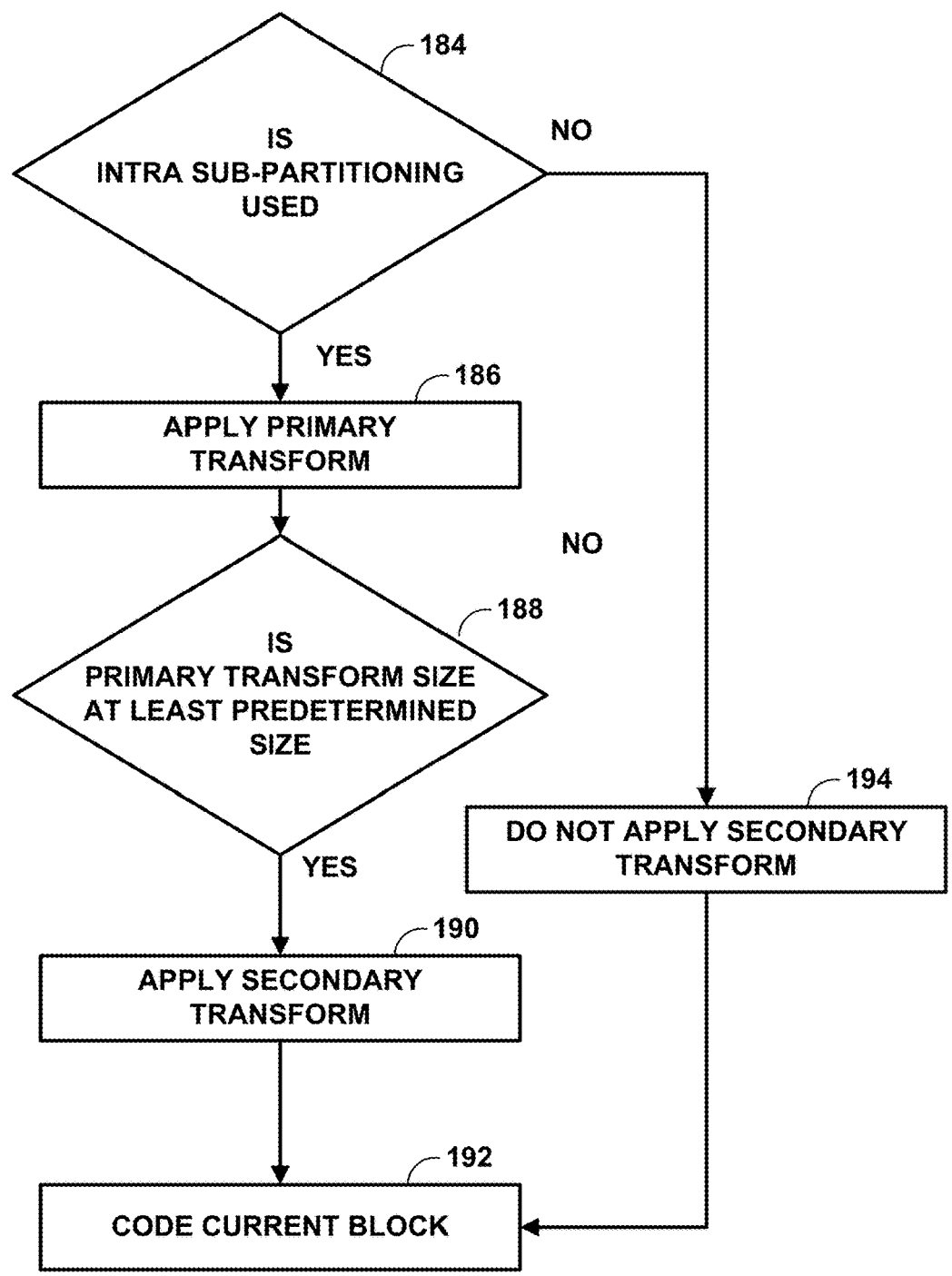
FIG. 12 is a flowchart illustrating techniques of this disclosure.

FIG. 12 is a flowchart illustrating an example method according to the techniques of the present disclosure. Video encoder 200 may determine whether intra sub-partitioning is used for a current block of video data (184). Video encoder 200 may apply a primary transform to the current block of video data (186). Video encoder may also determine whether a primary transform size is at least a predetermined size (188). If video encoder 200 determines that intra sub-partitioning is not used (the "NO" path from diamond 184 or if video encoder 200 determines that the primary transform size is not at least a predetermined size, e.g., 4×4, 8×8, 16×16 or any other predetermined size (the "NO" path from diamond 188), transform processing unit 206 of video encoder 200 may not apply a secondary transform (194). Video encoder 200 may code the current block of video data based on the primary transform coefficients as no secondary transform is applied (192). In the case that video encoder 200 determines that both intra-sub partitioning is used (the "YES" path from diamond 184) and that the primary transform is at least the predetermined size (the "YES" path from diamond 188), transform processing unit 206 of video encoder 200 may apply a secondary transform to the primary transform coefficients (190). Video encoder 200 may code the current block of video data based on the secondary transform in the case a secondary transform was applied (192).

Figure 13:
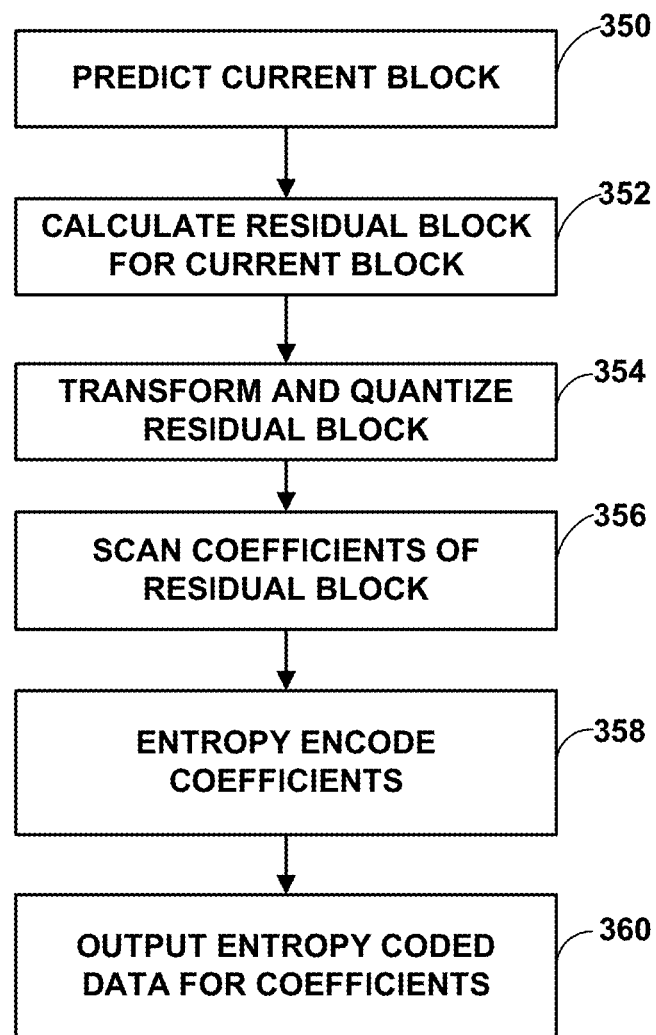
FIG. 13 is a flowchart illustrating an example video encoding method.

FIG. 13 is a flowchart illustrating an example method for encoding a current block. The current block may comprise a current CU. Although described with respect to video encoder 200 (FIGS. 1 and 2), it should be understood that other devices may be configured to perform a method similar to that of FIG. 13.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). For example, video encoder 200 may determine whether intra sub-partitioning is applied to a current block of video data. Transform processing unit 206 of video encoder 200 may apply a primary transform. Video encoder 200 may also determine whether a primary transform size for the current block of video data is at least a predetermined size. Transform processing unit 206 of video encoder 200 may apply a secondary transform to primary transform coefficients based on intra sub-partitioning being applied and the primary transform size being at least the predetermined size, and video encoder 200 may encode the current block of the video data based on the secondary transform. Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 14:
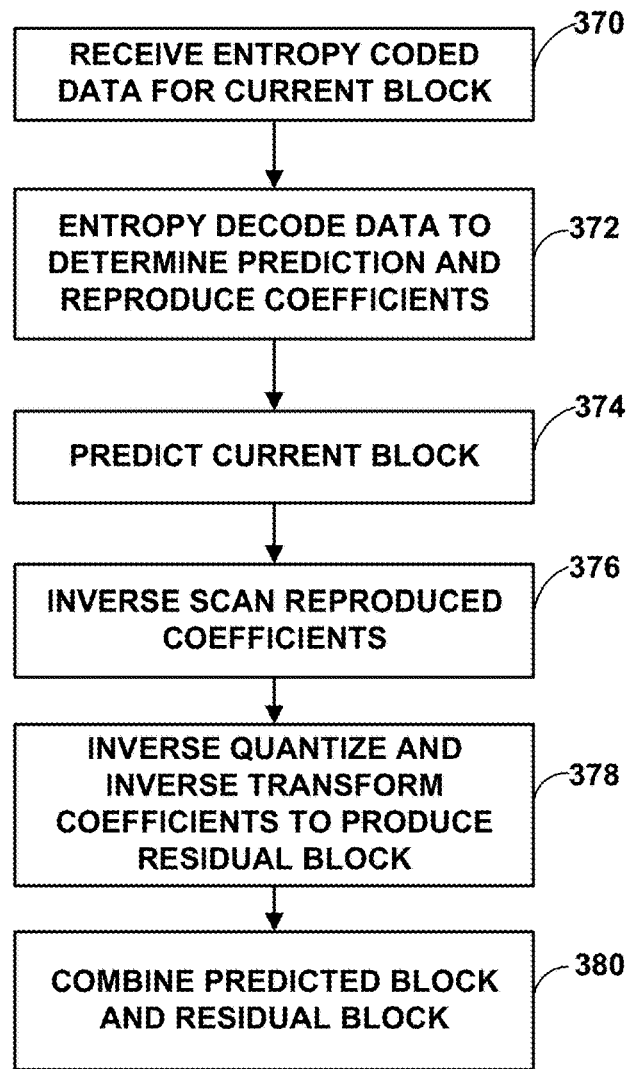
FIG. 14 is a flowchart illustrating an example video decoding method.

FIG. 14 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 14.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra or inter prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). For example, video decoder 300 may determine whether intra sub-partitioning is applied to a current block of video data. Video decoder 300 may also determine whether a primary transform size for the current block of video data is at least a predetermined size. Inverse transform processing unit 308 may apply an inverse secondary transform to inverse quantized data based on intra sub-partitioning being applied and the primary transform size being at least the predetermined size. Inverse transform processing unit may also inverse primary transform the inverse secondary transformed data. Video decoder 300 may decode the current block of the video data based on the secondary transform. Video decoder 300 may ultimately decode the current block by combining the prediction block and the residual block (380).

Examples according to this disclosure include the following:

EXAMPLE 1

A method of coding video data, the method comprising: coding a block of video data using one or more of a primary transform and a secondary transform according to the techniques of this disclosure.

EXAMPLE 2

The method of example 1, wherein intra sub-partitioning is applied to the block of video data, the method further comprising: coding the block of video data with only the primary transform.

EXAMPLE 3

The method of example 1, wherein coding the block of video data using one or more of the primary transform and the secondary transform comprises: applying the primary transform to the block of video data, including sub-blocks; and applying the secondary transform to primary transform coefficients.

EXAMPLE 4

The method of example 1, wherein coding the block of video data using one or more of the primary transform and the secondary transform comprises: applying the primary transform to the block of video data; and applying the secondary transform to a subset of coefficients obtained from the primary transform.

EXAMPLE 5

The method of example 1, wherein coding the block of video data using one or more of the primary transform and the secondary transform comprises: coding the block of video data using the secondary transform with a size K, wherein the secondary transform is based on matrix multiplication, HyGT, or hierarchical factorizations.

EXAMPLE 6

The method of example 1, wherein the secondary transform is a separable transform.

EXAMPLE 7

The method of example 1, wherein the secondary transform is a non-separable transform.

EXAMPLE 8

The method of example 1, wherein coding the block of video data using one or more of the primary transform and the secondary transform comprises: coding the block of video data using the secondary transform in the case that the block of video data is a transform unit having the same size as a coding unit.

EXAMPLE 9

The method of example 1, wherein coding the block of video data using one or more of the primary transform and the secondary transform comprises: coding the block of video data using the secondary transform on a subset of samples in the case that the block of video data is a transform unit not having the same size as a coding unit.

EXAMPLE 10

The method of example 1, further comprising: applying the primary transform to the block of video data; and applying the secondary transform to the K lowest frequency coefficients obtained from the primary transform.

EXAMPLE 11

The method of example 1, further comprising: applying the primary transform to the block of video data; and applying the secondary transform to all frequency coefficients or samples obtained from the primary transform.

EXAMPLE 12

Any combination of the techniques of examples 1-11.

EXAMPLE 13

A device for coding video data, the device comprising one or more means for performing the method of any of examples 1-12.

EXAMPLE 14

The device of example 13, wherein the one or more means comprise one or more processors implemented in circuitry.

EXAMPLE 15

The device of any of examples 13 and 14, further comprising a memory to store the video data.

EXAMPLE 16

The device of any of examples 13-15, further comprising a display configured to display decoded video data.

EXAMPLE 17

The device of any of examples 13-16, wherein the device comprises one or more of a camera, a computer, a mobile device, a broadcast receiver device, or a set-top box.

EXAMPLE 18

The device of any of examples 13-17, wherein the device comprises a video decoder.

EXAMPLE 19

The device of any of examples 13-18, wherein the device comprises a video encoder.

EXAMPLE 20

A computer-readable storage medium having stored thereon instructions that, when executed, cause one or more processors to perform the method of any of examples 1-12.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining whether intra sub-partitioning is applied to a current block of video data;
   applying a primary transform to the current block of video data to generate primary transform coefficients;
   based on intra sub-partitioning being applied, determining whether a size of the primary transform is at least a predetermined size, wherein the predetermined size is 4×4;
   based on intra sub-partitioning being applied and the size of the primary transform being at least the predetermined size, applying a secondary transform to the primary transform coefficients; and
   coding the current block of the video data based on the primary transform and the secondary transform.

2. The method of claim 1, wherein the secondary transform is applied to all the primary transform coefficients for the current block of video data.

3. The method of claim 1, wherein the secondary transform is applied to less than all the primary transform coefficients for the current block of video data.

4. The method of claim 1, wherein the secondary transform is a non-separable transform.

5. The method of claim 1, wherein the secondary transform is a separable transform.

6. The method of claim 1, wherein determining whether intra sub-partitioning is applied further comprises determining a type of partition used for the current block of video data and wherein applying the secondary transform is further based on the type of partition used for the current block of video data.

7. The method of claim 6, wherein the type of partition used is a binary-tree partition or a quad-tree partition.

8. The method of claim 1, wherein coding comprises encoding.

9. A device for coding video data, the device comprising:
   a memory configured to store video data; and
   one or more processors implemented in circuitry and in communication with the memory, the one or more processors being configured to:
      determine whether intra sub-partitioning is applied to a current block of video data;
      apply a primary transform to the current block of video data to generate primary transform coefficients;
      based upon intra sub-partitioning being applied, determine whether a size of the primary transform is at least a predetermined size, wherein the predetermined size is 4×4;
      based on intra sub-partitioning being applied and the size of the primary transform being at least the predetermined size, apply a secondary transform to the primary transform coefficients; and
      code the current block of the video data based on the primary transform and the secondary transform.

10. The device of claim 9, wherein the secondary transform is applied to all the primary transform coefficients for the current block of video data.

11. The device of claim 9, wherein the secondary transform is applied to less than all the primary transform coefficients for the current block of video data.

12. The device of claim 9, wherein the secondary transform is a non-separable transform.

13. The device of claim 9, wherein the secondary transform is a separable transform.

14. The device of claim 9, wherein the one or more processors are further configured to:
   determine a type of partition used for the current block of video data; and
   wherein the one or more processors apply the secondary transform further based on the type of partition used for the current block of video data.

15. The device of claim 14, wherein the type of partition used is a binary-tree partition or a quad-tree partition.

16. A non-transitory computer-readable storage medium having stored thereon instructions that, when executed, cause one or more processors to:
   determine whether intra sub-partitioning is applied to a current block of video data;
   apply a primary transform to the current block of video data to generate primary transform coefficients;
   based on intra sub-partitioning being applied, determine whether a size of the primary transform is at least a predetermined size, wherein the predetermined size is 4×4;
   based on intra sub-partitioning being applied and the size of the primary transform being at least the predetermined size, apply a secondary transform to the primary transform coefficients; and
   code the current block of the video data based on the primary transform and the secondary transform.

17. The non-transitory computer-readable medium of claim 16, wherein the secondary transform is a non-separable transform.

* * * * *